United States Patent [19]

Miller et al.

[11] 4,446,910

[45] May 8, 1984

[54] TWO-PHASE THERMAL STORAGE MEANS AND METHOD

[75] Inventors: Russell S. Miller, Saratoga; Peter W. Dietz, Delanson, both of N.Y.; Christopher Bray, Chillicothe, Ill.

[73] Assignee: General Electric Company, Schenectady, N.Y.

[21] Appl. No.: 353,684

[22] Filed: Mar. 1, 1982

Related U.S. Application Data

[62] Division of Ser. No. 152,423, May 22, 1980, abandoned.

[51] Int. Cl.³ .................. F28D 17/00; F28D 21/00
[52] U.S. Cl. .................................. 165/1; 62/59; 62/71; 126/436; 165/10; 165/104.11; 165/104.17

[58] Field of Search ............... 165/10, 104.17, 104.11, 165/1; 126/436

[56] References Cited

U.S. PATENT DOCUMENTS 1,969,187  8/1934  Schutt ..................................... 165/2
4,227,567 10/1980  Greene ....................... 165/104.17 X Primary Examiner—Albert W. Davis, Jr.
Attorney, Agent, or Firm—Paul J. Checkovich; James C. Davis, Jr.; Marvin Snyder

[57] ABSTRACT

Latent heat is stored in a liquid storage material having a variable phase-dependent density from which material heat is subsequently removed by heat transfer with an immiscible liquid interfaced with the storage material, such that storage material at the interface is solidified resulting in the separation thereof from the interface by buoyancy forces.

18 Claims, 3 Drawing Figures

TWO-PHASE THERMAL STORAGE MEANS AND METHOD

This application is a division of application Ser. No. 152,423, filed May 22, 1980, now abandoned.

BACKGROUND OF THE INVENTION

This invention relates generally to means and methods for thermal storage, and more particularly, to two-phase thermal storage means and methods.

Thermal storage systems are useful in many applications, such as for power plant load leveling as described in U.S. Pat. No. 3,848,416(Bundy). In these systems thermal energy is preferably stored by exploiting the mechanism of latent heat storage rather than of sensible heat storage so as to obtain a more compact unit. Such latent heat or "two-phase" thermal storage systems may incorporate either a gas-to-liquid or a liquid-to-solid phase transformation. However, gas-to-liquid phase transformations typically involve large variations in fluid volume, thereby severely complicating the design of an associated thermal storage system.

Liquid-to-solid thermal storage systems also present several design complications including heat transfer coefficient degradation and low volumetric efficiency. For example, in a conventional tube-bundle heat exchanger in which cooling tubes are immersed in a supply of liquid phase-transformation material, the cooling of the material results in the solidification thereof on the tube surfaces. As the solids accumulate on the tubes, the heat transfer coefficient for the unit decreases rapidly, with the heat transfer rate eventually becoming too low for most practical applications. Thus, in an exemplitive application involving a vapor compression cycle device, such a reduction in heat transfer rate would effect a corresponding degradation of the device coefficient of performance until a point is reached at which the continued operation of the device would be impractical. Additionally, when this point is reached, there is typically a core of liquid phase-transformation material remaining in the regions of the heat exchanger unoccupied by the solidified material. This remaining liquid represents a less than optimum system volumetric efficiency since the volume occupied by the liquid could be used for additional thermal storage.

Of course, problems of heat transfer coefficient degradation and low volumetric efficiency are not limited to tube-bundle systems but are present to varying degrees in substantially all conventional liquid-to-solid two-phase thermal storage systems including those which involve the direct contact of two liquids as typified by the system described in the above-noted U.S. Pat. No. 3,848,416(Bundy).

Accordingly, it is an object of the present invention to provide a new and improved two-phase thermal storage means and method.

Another object of the present invention is to provide a new and improved thermal storage device capable of high volumetric efficiency.

Still another object of the present invention is to provide a new and improved two-phase thermal storage means and method which enables a substantially continuous, efficient transfer of heat to and from storage.

SUMMARY OF THE INVENTION

The above and other objects and advantages are achieved in a two-phase thermal storage method in which a temperature sensitive phase transformation storage material having different density liquid and solid phases is interfaced with an immiscible heat transfer liquid having a solidification temperature less than that of the storage material. In a heat removal mode of operation the heat transfer liquid is cooled below the liquid-to-solid phase transformation temperature of the storage material. Thermal transfer along the interfacial surface area results in the solidification of liquid storage material thereat, with the solidified material being substantially continuously removed from the interface by buoyancy forces whereby an efficient level of heat transfer is maintained across the interface. Additionally, the removed solid material is of such a configuration as to enable the attainment of high volumetric efficiency when stored. In a corresponding heat addition mode of operation heat is transferred to the at least partially solidified storage material and is stored therein by transforming the material from a solid to a liquid phase. The invention also includes a means for carrying out the above-described two-phase thermal storage method.

BRIEF DESCRIPTION OF THE DRAWING

For better understanding of the invention, reference may be had to the accompanying drawing wherein.

DESCRIPTION OF THE INVENTION

Figure 1:
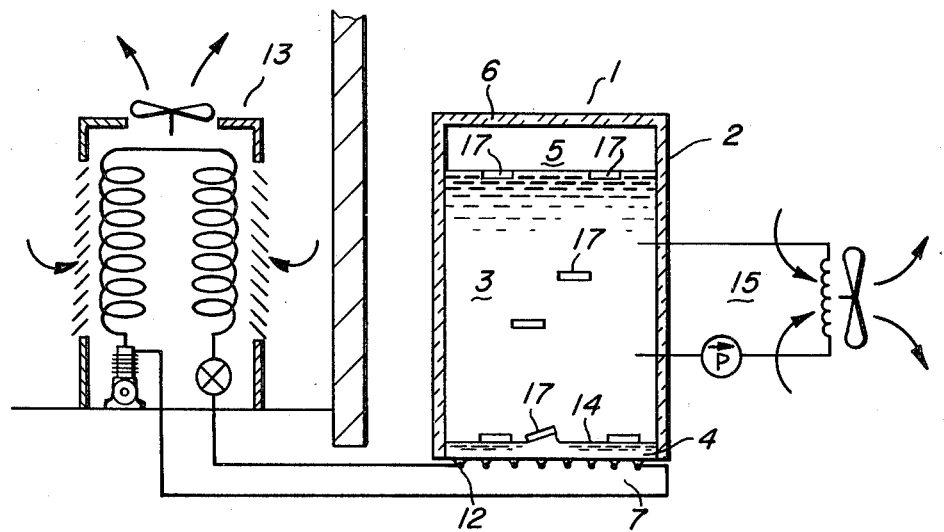
FIG. 1 is a schematic representation of an embodiment of the present invention as utilized in an exemplitive air conditioning system.
Figure 2:
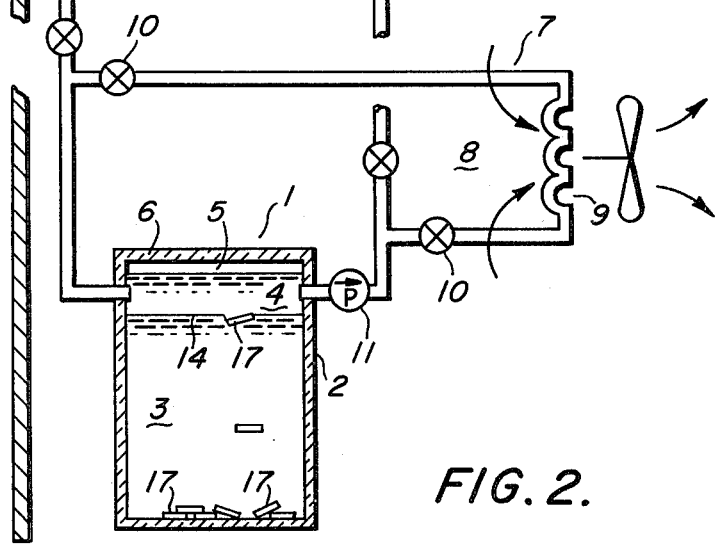
FIG. 2 is a partially cross-sectional schematic representation of an alternative embodiment of the present invention as utilized in an exemplitive solar heating system.

As exemplified by the systems depicted in FIGS. 1 and 2, a two-phase thermal storage device 1 constructed according to the present invention can be employed in a number of different applications. Such a device 1 includes a vessel 2 containing a storage material 3 interfaced with a heat transfer liquid 4.

The vessel 2 may be a conventional tank of sufficient height to allow the formation of a dead volume 5 above the combined volumes of the heat transfer liquid 4 and the storage material 3 so as to accommodate any expansion thereof during phase transformations. The vessel 2 may also be advantageously provided with thermal insulation 6.

The storage material 3 is a temperature sensitive phase transformation material the density of which varies by either increasing or decreasing upon phase transformation between liquid and solid phases. Thus, water and napthol which display a density decrease and increase, respectively, upon solidification from a liquid phase are potential storage materials.

The heat transfer liquid 4 is immiscible with a cooperating storage material 3. The liquid 4 also has a characteristic solidification temperature sufficiently below that of the cooperating storage material 3 so as to enable the solidification of the material 3 without solidifying the liquid 4. Moreover, when used with a storage material having a denser solid phase than liquid phase, the cooperating heat transfer liquid must be less dense than the storage material to allow for removal and storage of solidified material as described hereinbelow. Similarly, when used with a storage material the density of which decreases in the solid phase, a cooperating heat transfer liquid must be denser than the corresponding storage material. Thus, for the exemplary storage materials noted above (i.e. water and napthol) suitable complimentary heat transfer liquids might be a refrigerant R-113/kerosene mixture and water, respectively. Additional candidate pairs of storage materials and heat transfer liquids are listed in Table I.

TABLE I

| Storage Material | Heat Transfer Liquid | Approx. Freezing Pt. (F) | Typical Application |
| --- | --- | --- | --- |
| Water | R-113/Kerosene | 32 | Air Conditioning |
| Water | Mercury | 32 | Air Conditioning |
| Paraffin($C_{12}$-$C_{14}$) | Water | ~45 | Air Conditioning |
| Paraffin($C_{22}$-$C_{23}$) | Water | 116 | Residential Space Heating |
| Sulfur Trioxide($SO_3$) | Petroleum Oil | 144 | Residential Space or Industrial Process Heating |
| Naphtol | Water | 205 | Industrial Process Heating or Absorption Air Conditioning |

However, it is understood that Table I is far from an exhaustive list of such candidate pairs. Proper pair selection for a given application requires consideration of the temperature range needed for that application. Accordingly, several suggested applications are noted for the pairs listed in Table I. Practical considerations for pair selection also include the cost and the thermal conductivity of pair constituents. However, the effect of these considerations can be minimized through the selection of a proper cooling means.

More specifically, a means 7 suitable for a given application is provided in the device 1 for cooling the heat transfer liquid 4. For example, an active cooling means 7 such as depicted in FIG. 2 in which the liquid 4 is circulated outside of the vessel 2 may be advantageously employed with a relatively inexpensive heat transfer liquid 4 due to the quantity thereof required for such a system. Additionally, when the liquid 4 is cooled in an associated active cooling means, such as the exemplitive area heating system 8 illustrated in FIG. 2, the liquid 4 should be compatible therewith. The area heating system 8 includes a heat exchanger 9 for transferring heat from the liquid 4 to a relatively cold flow of air, isolation valves 10, and a circulation pump 11, all of which are in flow communication with a supply of heat transfer liquid 4 in the device 1.

Figure 3:
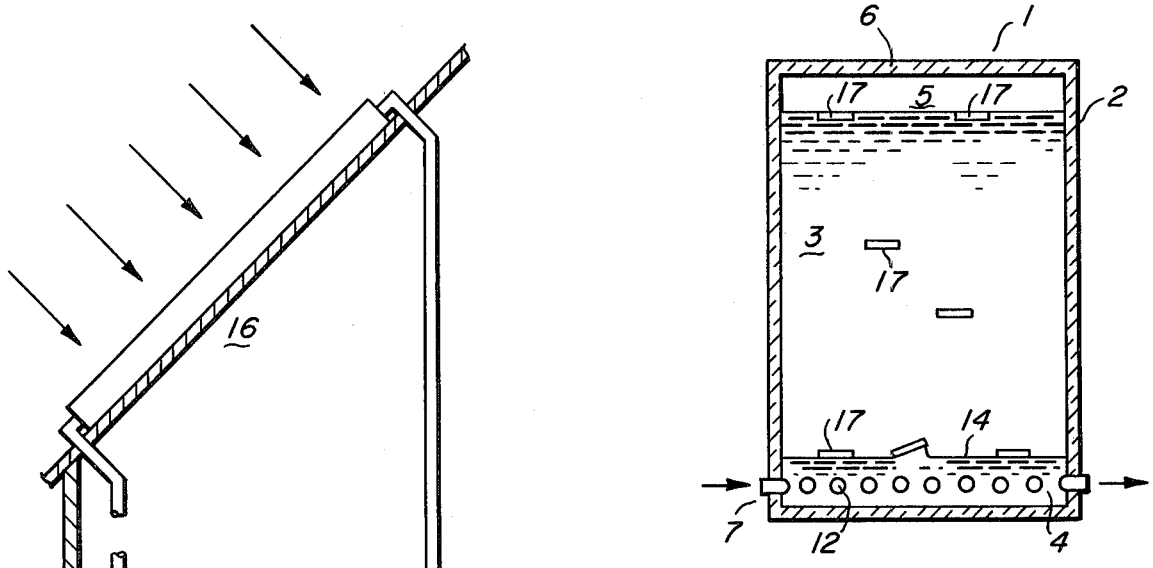
FIG. 3 is a cross-sectional view of another embodiment of the present invention.

Passive cooling means 7 such as depicted in FIGS. 1 and 3 in which heat transfer liquid 4 is cooled in-situ within the device 1 may be advantageously employed with more expensive heat transfer liquids 4 so as to minimize the quantity thereof required. The passive cooling means 7 depicted in FIGS. 1 and 3 both include a heat exchange device 13 such as a conventional cooling coil disposed so as to enable a transfer of heat between the liquid 4 and refrigerant circulated through the device 12. In the embodiment illustrated in FIG. 1 a cooling coil is brazed to the bottom of the vessel 2 so as to effect a thermal contact between the liquid 4 and the refrigerant in the coil 12 through the walls of the vessel 2 and of the cooling coil 12. This embodiment requires only a relatively thin layer of heat transfer liquid 4 in the device 1, and is thus advantageously employed with heat transfer liquids 4 which are particularly expensive and/or exhibit poor thermal conductivity.

In contrast, the heat exchange device 12 in FIG. 3 is immersed in heat transfer liquid 4 in the vessel 2, which thereby improves heat transfer between the liquid 4 and the refrigerant circulated in the device 12. However, due to the immersion of the device 12, the associated layer of heat transfer liquid 4 in the embodiment depicted in FIG. 3 is necessarily thicker than that required in the embodiment depicted in FIG. 1. In the embodiments depicted both in FIGS. 1 and 3 a means such as conventional heat pump 13 is employed to cool the refrigerant circulated in the heat exchange device 12.

Although heat is removed from the storage material 3 by heat transfer along an interface 14 with the cooled heat transfer liquid 4 according to the present invention, the addition of heat to the storage material 3 may be accomplished by various systems. For example, in the embodiment depicted in FIG. 1 heat is added to the storage material 3 by circulating the material through a conventional heat exchange system 15 connected in flow communication with the storage material 3 within the vessel 2.

Alternatively, a passive system for the addition of heat to the material 3 may be employed such as in the embodiment depicted in FIG. 2. Thus, for example, a conventional solar heating system 16 may be connected in selective flow communication with the heat transfer liquid 4 contained in the vessel 2. In this manner heat may be added to the storage material 3 by heat transfer along the interface 14 with the liquid 4.

During operation in a heat removal mode of operation, storage material 3 in a liquid phase is initially provided along the interface 14 with a suitable heat transfer liquid 4. The heat transfer liquid 4 is cooled by a suitable cooling means 7 such as through thermal contact with refrigerant flowing through a heat exchange device 12 as depicted in FIGS. 1 and 3. The refrigerant is in turn cooled as through the operation of the heat pump 13. The heat transfer liquid 4 is sufficiently cooled thereby to effect the nucleation of crystals 17 of the solid material 3 at the liquid-to-liquid interface 14 between the two. Crystal growth proceeds until either the buoyancy of the resultant solidified storage material 3 is sufficient to lift the solid from the surface as depicted in FIG. 1, or alternatively, until the buoyancy of the storage material liquid is sufficient to cause the denser solidified storage material to disengage from the interface 14 and drift to the bottom of the vessel 2 as depicted in FIG. 2. In certain vessel configurations means such as a wave generator may be advantageously employed to facilitate the disengagement of the solidified material.

In this manner solidified material is substantially continuously removed from the interfacial heat transfer surface 14 to maintain a relatively constant heat transfer rate thereat. Moreover, since storage liquid will preferentially migrate to the interfacial surface 14 in the present invention, the volumetric efficiency thereof as reflected by storage material utilization is maximized. Additionally, the solidified storage material 17 is typically of a flat configuration which enables optimal volumetric efficiency when properly stacked.

In a heat storage mode of operation, heat is added to the storage material 3 by employing a heat addition system. Thus, in the embodiment depicted in FIG. 1 the material 3 is circulated through the heat exchange system 15 wherein heat is recovered from a related hot environment. Alternatively, heat can be added passively to the material 3 as in the embodiment illustrated in FIG. 2 wherein the transfer liquid 4 is initially heated in the solar system 16. The heat is then transferred to the storage material 3 by direct contact heat exchange along the interfacial surface area 14. Heat is preferably stored in the material 3 as latent heat by converting solid storage material to a liquid. However, sensible heat may also be stored therein.

The benefits of the present invention can perhaps be better appreciated by an illustrative example based on the air conditioning application depicted in FIG. 1. Several candidate pairs of storage material and heat transfer liquid are available. However, in this explitive embodiment water/ice is selected as the storage material and mercury is selected as the heat transfer liquid. The mercury is cooled by a passive means 7 as depicted in FIG. 1, both due to the good thermal conductivity of mercury and due to the environmental problems associated with its use.

For a typical single family residence in a Washington, D.C. climate, a device having a 3.72'×3.46'×3.46' vessel containing approximately 44.6 ft.$^3$ of water/ice at 90% volumetric efficiency would provide sufficient thermal storage capacity to provide 12 hours of cooling on the hottest day of the year. A 3-ton heat pump is used to cool 0.1 cubic feet of mercury which is disposed in a 0.1 inch layer along a 3.46'×3.46' (12 ft.$^2$) interfacial surface area with the water/ice storage material. Such a device could store approximately 30,000 BTU/hr., while incurring temperature drops of 4.3° F. and of 6.8° F. across the mercury and an interfacial ice layer (1/25"), respectively. Additionally, the illustrative device would be capable of providing electric load management on a diurnal basis. In particular, a system as described above would be capable of reducing peak power demands during the daylight billing period by 90% with only a 15% increase in 24 hour energy use. Systems utilizing a higher temperature storage material (~45° F.) can achieve similar power reduction with only a 5% increase in 24 hour energy consumption, since this allows a relatively higher coefficient of performance in the cooperating heat pump.

In contrast, calculations indicate that equivalent load management and efficiency performance in a conventional ice/water thermal storage system employing flat plate heat exchangers spaced on 4.5" centers would require 230 ft.$^2$ of heat transfer area, or approximately twenty times that of the present embodiment of this invention. Calculations also indicate that a similar thermal storage system utilizing a sensible heat mechanism would require at least five times the storage material as the present invention.

The above-described embodiments of this invention are intended to be exemplitive only and not limiting and it will be appreciated from the foregoing by those skilled in the art that many substitutions, alterations and changes may be made to the disclosed structure and method without departing from the spirit or scope of the invention.

What we claim as new and desire to be secured by Letters Patent of the United States is:

1. A two phase thermal storage method comprising the steps of:
   providing a temperature-sensitive phase transformation storage material having a phase-dependent variable density;
   contacting an immiscible heat transfer liquid with said storage material;
   storing heat in the liquid phase of said storage material by heating said heat transfer liquid to a temperature above the temperature of storage material contacting said heat transfer liquid whereby heat stored in said storage material is increased; and
   removing said stored heat by cooling said heat transfer liquid to a temperature below the liquid-to-solid phase-transformation temperature of said storage material whereby at least a portion of said storage material is solidified at the interface with said heat transfer fluid, and removing solidified storage material from said interface by bouyancy forces;
   wherein said heat transfer liquid may be cooled by circulating a quantity of heat transfer liquid from the interface with said storage material through a heat exchange relationship with a coolant and returning said quantity of liquid to said interface,
   and further wherein said heat transfer liquid may be heated by circulating a quantity of the heat transfer liquid from the interface with said storage material through heat exchange relationship with a source of heat and returning said quantity of liquid to said interface.

2. A thermal storage method as in claim 1 in which density of said storage material increases upon solidification, wherein said solidified storage material is removed downward from said interface through relatively less dense liquid phase storage material.

3. A thermal storage method as in claim 1 in which the density of said storage material decreases upon solidification, wherein said solidified storage material is removed upward from said interface through relatively denser liquid phase storage material.

4. A thermal storage method as in claim 3 wherein said storage material is water and said heat transfer liquid is a mixture of kerosene and refrigerant R-113.

5. A thermal storage method as in claim 3 wherein said storage material is paraffin ($C_{12}$–$C_{14}$) and said heat transfer liquid is water.

6. A thermal storage method as in claim 3 wherein said storage material is water and said heat transfer liquid is mercury.

7. A thermal storage method as in claim 3 wherein said storage material is paraffin ($C_{22}$–$C_{23}$) and said heat transfer liquid is water.

8. A thermal storage method as in claim 2 wherein said storage material is sulfur trioxide and said heat transfer liquid is petroleum oil.

9. A thermal storage method as in claim 2 wherein said storage material is naphtol and said heat transfer liquid is water.

10. A two-phase thermal storage device comprising a vessel, a temperature-sensitive phase-transformation storage material disposed in said vessel which material changes density upon transformation from a liquid to a solid phase, an immiscible heat transfer liquid interfaced with said storage material in said vessel, a means for selectively cooling said heat transfer liquid to a temperature below the liquid-to-solid phase-transformation temperature of said storage material, and a means for selectively heating said heat transfer liquid, wherein said cooling means comprises first heat exchange apparatus in thermal contact with a coolant and said heating means comprises second heat exchange apparatus in thermal communication with a source of heat, and means for controllably circulating a quantity of said heat transfer fluid from said vessel through said first heat exchange apparatus and through said second heat exchange apparatus, respectively, and returning said quantity of fluid to said vessel, whereby heat is selectively removed from and added to, respectively, said storage material at the interface with said heat transfer liquid.

11. A thermal storage device as in claim 10 wherein the
storage material has a denser solid phase than a liquid phase, and said heat transfer liquid is less dense than said storage material liquid phase.

12. A thermal storage device as in claim 10 wherein the
storage material has a denser liquid phase than a solid phase, and said heat transfer liquid is denser than said storage material liquid phase.

13. A thermal storage device as in claim 12 wherein said
storage material is water and said heat transfer liquid is a mixture of kerosene and refrigerant R-113.

14. A thermal storage device as in claim 12 wherein said
storage material is paraffin ($C_{12}$–$C_{14}$) and said heat transfer liquid is water.

15. A thermal storage device as in claim 12 wherein said
storage material is water and said heat transfer liquid is mercury.

16. A thermal storage device as in claim 12 wherein said
storage material is paraffin ($C_{22}$–$C_{23}$) and said heat transfer liquid is water.

17. A thermal storage device as in claim 11 wherein said
storage material is sulfur trioxide and said heat transfer liquid is petroleum oil.

18. A thermal storage device as in claim 11 wherein said
storage material is naphtol and said heat transfer liquid is water.

* * * * *